United States Patent
Ibragimov

(10) Patent No.: US 10,771,162 B2
(45) Date of Patent: Sep. 8, 2020

(54) COHERENT OPTICAL RECEIVER WITH IMPROVED NOISE PERFORMANCE FOR OPTICAL FIBER COMMUNICATION LINKS

(71) Applicant: GREENSAND NETWORKS INC., Santa Clara, CA (US)

(72) Inventor: Edem Ibragimov, Santa Clara, CA (US)

(73) Assignee: GREENSAND NETWORKS INC., Santa Clara, CA (US)

(*) Notice: Subject to any disclaimer, the term of this patent is extended or adjusted under 35 U.S.C. 154(b) by 0 days.

(21) Appl. No.: 16/277,881

(22) Filed: Feb. 15, 2019

(65) Prior Publication Data

US 2019/0181962 A1 Jun. 13, 2019

Related U.S. Application Data

(63) Continuation-in-part of application No. PCT/US2017/047034, filed on Aug. 15, 2017.

(60) Provisional application No. 62/375,413, filed on Aug. 15, 2018.

(51) Int. Cl.
H04B 10/61 (2013.01)

(52) U.S. Cl.
CPC ....... *H04B 10/6165* (2013.01); *H04B 10/616* (2013.01); *H04B 10/6162* (2013.01); *H04B 10/6164* (2013.01)

(58) Field of Classification Search
CPC combination set(s) only.
See application file for complete search history.

(56) References Cited

U.S. PATENT DOCUMENTS

| 7,899,340 B1 | 3/2011 | Bontu et al. |
| 9,337,934 B1 | 5/2016 | Agazzi et al. |
| 2007/0092259 A1* | 4/2007 | Bontu ............... H04J 14/06 398/147 |
| 2007/0092260 A1* | 4/2007 | Bontu ............... H04J 3/0608 398/152 |
| 2011/0150478 A1 | 6/2011 | Winzer |

(Continued)

FOREIGN PATENT DOCUMENTS

WO 2014194940 A1 12/2014

OTHER PUBLICATIONS

International Search Report and Written Opinion from PCT/US2017/047034 dated Nov. 16, 2017 (9 pages).

(Continued)

*Primary Examiner* — Omar S Ismail
(74) *Attorney, Agent, or Firm* — Perkins Coie LLP

(57) ABSTRACT

The technology disclosed in this patent document can be implemented to provide an analog front part of an optical receiver module for coherent optical detection where the optical receiver module receives the optical input from a fiber link, performs optical to electrical conversion and analog processing for carrier frequency compensation, optical phase noise compensation and polarization rotation, and generates an analog electrical output for subsequent signal processing for coherent optical detection. The analog processing for the polarization rotation is placed downstream from the analog processing for carrier frequency compensation, and in some implementations, downstream from the analog processing for optical phase noise compensation.

21 Claims, 7 Drawing Sheets

Integrating Polarization Rotation and Phase Noise Compensation

(56) References Cited

U.S. PATENT DOCUMENTS

| | | | | |
|---|---|---|---|---|
| 2012/0141130 A1* | 6/2012 | Nakashima | .......... | H04B 10/505 |
| | | | | 398/82 |
| 2013/0183034 A1* | 7/2013 | Zhang | .................. | H04B 10/616 |
| | | | | 398/46 |
| 2013/0216228 A1* | 8/2013 | Nazarathy | ............... | H04J 14/06 |
| | | | | 398/65 |
| 2013/0315609 A1* | 11/2013 | Li | ........................ | H04B 10/613 |
| | | | | 398/208 |
| 2014/0363176 A1* | 12/2014 | Mizuguchi | ......... | H04B 10/6165 |
| | | | | 398/204 |
| 2015/0162991 A1* | 6/2015 | Gupta | ................... | H04B 10/61 |
| | | | | 398/202 |

OTHER PUBLICATIONS

Supplementary European Search Report from corresponding European Application No. 17842026, dated Mar. 9, 2020 (10 pages).

Anita Gupta et al: "Analog processing 1-7 based carrier phase recovery and equalization for coherent optical receivers", Signal Processing and Communications (2012) pp. 1-5.

Niambath Nandakumar et al "Analog Domain 1-7 Signal Processing-Based Low-Power 100-Gb/s DP-QPSK Receiver", Journal of Lightwave Technology, IEEE, USA, (2015) vol. 33, No. 15, pp. 3189-3197.

Patil Yogesh et al "Analog 1-7 processing-based coherent optical receiver for 16-QAM signals with 12.5 GBd baud rate" 2016 Twenty Second National Conference on Communication (NCC), IEEE, (2016), pp. 1-6.

* cited by examiner

Integrating Polarization Rotation and Phase Noise Compensation

COHERENT OPTICAL RECEIVER WITH IMPROVED NOISE PERFORMANCE FOR OPTICAL FIBER COMMUNICATION LINKS

PRIORITY CLAIM AND RELATED PATENT APPLICATION

This U.S. patent document is a continuation-in-part application under 35 USC 120 to claim the priority and benefits of PCT Application No. PCT/US2017/47034 entitled "ANALOG COHERENT RECEIVER FOR OPTICAL FIBER COMMUNICATION LINKS" and filed on Aug. 15, 2017 which further claims the priority and benefits of U.S. Provisional Application No. 62/375,413 entitled "ANALOG COHERENT RECEIVER FOR OPTICAL FIBER COMMUNICATION LINKS" and filed Aug. 15, 2016. The disclosure of the PCT Application No. PCT/US2017/47034 (and its PCT publication) and the U.S. Provisional Application No. 62/375,413 is incorporated by reference as part of this U.S. patent document.

TECHNICAL FIELD

This patent document relates to devices and techniques in signal processing in a receiver in a fiber communication link such as optical fiber communication networks.

BACKGROUND

Optical communications via fiber networks can be adversely affected by certain physical properties or processes in optical fiber, such as optical attenuation, chromatic dispersion (CD), polarization mode dispersion (PMD), optical phase noise (PN) and nonlinear optical effects in optical fiber. Coherent optical detection technologies have been developed to mitigate those adverse effects in which a local oscillator (LO) laser (e.g., a continuous-wave laser) is used in an optical receiver to coherently combine with the received optical transmission signal before being detected by an optical detector. This coherent optical detection with the LO laser is used to obtain the optical phase information in the received optical transmission signal.

Coherent optical detection can be used to increase more information to be carried in one optical channel than the corresponding direct detection. Because of that advantage, coherent optical detection can be used to improve long hall communications via fiber links. For optical communications over shorter distances that are much more sensitive to the price, footprint, and power dissipation, coherent optical detection technologies are not presently used in most commercial deployment. Coherent optical detection technologies also allow compensate for such deteriorating effects as Chromatic Dispersion (CD), Polarization Mode Dispersion (PMD), and frequency dependent losses in electrical and opto-electrical elements. However, One of the approaches to coherent optical detection is using digital signal processing (DSP) in the digital domain to reduce adverse impacts of the transmission system impairments.

SUMMARY

The technology disclosed in this patent document can be implemented to provide an analog front part of an optical receiver module for coherent optical detection where the optical receiver module receives the optical input from a fiber link, performs optical to electrical conversion and analog processing for carrier frequency compensation, optical phase noise compensation and polarization rotation, and generates an analog electrical output for subsequent signal processing for coherent optical detection. The analog processing for the polarization rotation is placed downstream from the analog processing for carrier frequency compensation, and in some implementations, downstream from the analog processing for optical phase noise compensation.

The technology disclosed in this patent document can be implemented as a part of an optical receiver module for coherent optical detection where the optical receiver module receives the optical input from a fiber link, performs optical to electrical conversion and analog processing for carrier frequency compensation, optical phase noise compensation and polarization rotation, and generates an analog electrical output for subsequent digital signal processing for coherent optical detection. The analog processing for the polarization rotation is placed downstream from the analog processing for carrier frequency compensation, and in some implementations, downstream from the analog processing for optical phase noise compensation, and in some implementations analog processing for optical phase noise compensation is combined with analog polarization compensation block. In the latter case one of the additional advantages is a cycle-free performance of the optical phase noise compensating block. Such combination can be also implemented as described in digital coherent receivers where all the operations of carrier offset compensation, polarization rotation and optical phase noise compensation are performed digitally In a first exemplary aspect, the disclosed technology can be implemented to provide a coherent optical receiver for a fiber communication link that includes an analog signal processing block as part of the optical receiver. The analog signal processing block includes an input port to receive electrical signals with a 90-degree phase shift based on an optical signal; a chromatic dispersion equalizer analog circuit to process the electrical signals to provide chromatic dispersion compensation in the optical signal; a carrier frequency compensation analog circuit to perform a carrier frequency compensation of a carrier frequency offset in the optical signal; an optical phase noise compensation analog circuit to perform a phase noise compensation to recover carrier phase of the optical signal; and a polarization rotation analog circuit downstream from the carrier frequency compensation analog circuit and optical phase noise compensation analog circuit to cause polarization rotation compensation in received signals. In some implementations, a 90 degrees optical hybrid may be used and is coupled by a downstream pair of balanced photo detectors and an amplifier such as a transimpedance amplifier (TIA).

In a second exemplary aspect, a coherent optical receiver for a fiber communication link can be implemented based on the disclosed technology as an analog signal processing block as part of the optical receiver. The analog signal processing block includes a chromatic dispersion equalizer analog circuit to receive signals that are from or derived from signals produced by a 90-degree hybrid analog block in response to an optical signal to provide chromatic dispersion compensation to the received signals; a carrier frequency compensation analog circuit to cause carrier frequency compensation in received signals that are from or derived from signals produced by the 90-degree hybrid analog block; an optical phase noise compensation analog circuit to cause optical phase noise compensation to received signals that are from or derived from signals produced by the 90-degree hybrid analog block; and a polarization rotation analog circuit to cause compensation to received signals that are from or derived from signals produced by the 90-degree hybrid analog block.

In implementations of the above analog signal processing block of the second aspect, the 90-degree hybrid analog block can be coupled to the chromatic dispersion equalizer which is downstream from the 90-degree hybrid analog block, the carrier frequency compensation analog circuit is coupled downstream from the chromatic dispersion equalizer, the optical phase noise compensation analog circuit is coupled downstream from the carrier frequency compensation analog circuit, and the polarization rotation analog circuit is coupled downstream from the carrier frequency compensation analog circuit and the optical phase noise compensation analog circuit.

In implementations of the above second aspect, the analog signal processing block may further include a phase detection circuit that is coupled between the optical phase noise compensation analog circuit and an output port of the polarization rotation analog circuit to provide phase detection information to the optical phase noise compensation analog circuit and a voltage controlled oscillator (VCO) circuit coupled to use the phase detection information from the phase detection circuit in operating the carrier frequency compensation analog circuit. The phase detection circuit may also be coupled to the optical phase noise compensation analog circuit to use the phase detection information in operating the optical phase noise compensation analog circuit.

In implementations of the above analog signal processing block in the second aspect, the polarization rotation analog circuit may be coupled downstream from the carrier frequency compensation analog circuit and the optical phase noise compensation analog circuit to implement an analog least mean square algorithm for the polarization rotation processing.

In a third exemplary aspect, a coherent optical receiver for a fiber communication link can be implemented based on the disclosed technology as an analog signal processing block as part of the optical receiver. The analog signal processing block includes a chromatic dispersion equalizer analog circuit to receive signals that are from or derived from signals produced by a 90-degree hybrid analog block to provide chromatic dispersion compensation to the received signals; a carrier frequency compensation analog circuit to cause carrier frequency compensation in received signals; and a polarization rotation analog circuit coupled downstream from the carrier frequency compensation analog circuit to implement an analog least mean square algorithm for the polarization rotation processing and to perform optical phase noise compensation to received signals from the carrier frequency compensation analog circuit. In implementing the above analog signal processing block having the polarization rotation analog circuit coupled downstream from the carrier frequency compensation analog circuit, the analog signal processing block may further include a phase detection circuit that is coupled to an output port of the polarization rotation analog circuit to provide phase detection information to the carrier frequency compensation analog circuit and a voltage controlled oscillator (VCO) circuit coupled to use the phase detection information from the phase detection circuit in operating the carrier frequency compensation analog circuit.

In yet a fourth implementation example, a coherent optical receiver for a fiber communication link including an analog signal processing block as part of the optical receiver can include the following in the analog signal processing block without the CD compensation block: an input port to receive electrical signals with a 90-degree phase shift based on an optical signal; a carrier frequency compensation analog circuit to perform a carrier frequency compensation of a carrier frequency offset in the optical signal; an optical phase noise compensation analog circuit to perform a phase noise compensation to recover carrier phase of the optical signal; and a polarization rotation analog circuit downstream from the carrier frequency compensation analog circuit and optical phase noise compensation analog circuit to cause polarization rotation compensation in received signals.

The above examples, features and their implementations of the disclosed technology are described in greater detail in the drawings, the description and the claims.

DETAILED DESCRIPTION

Figure 1:
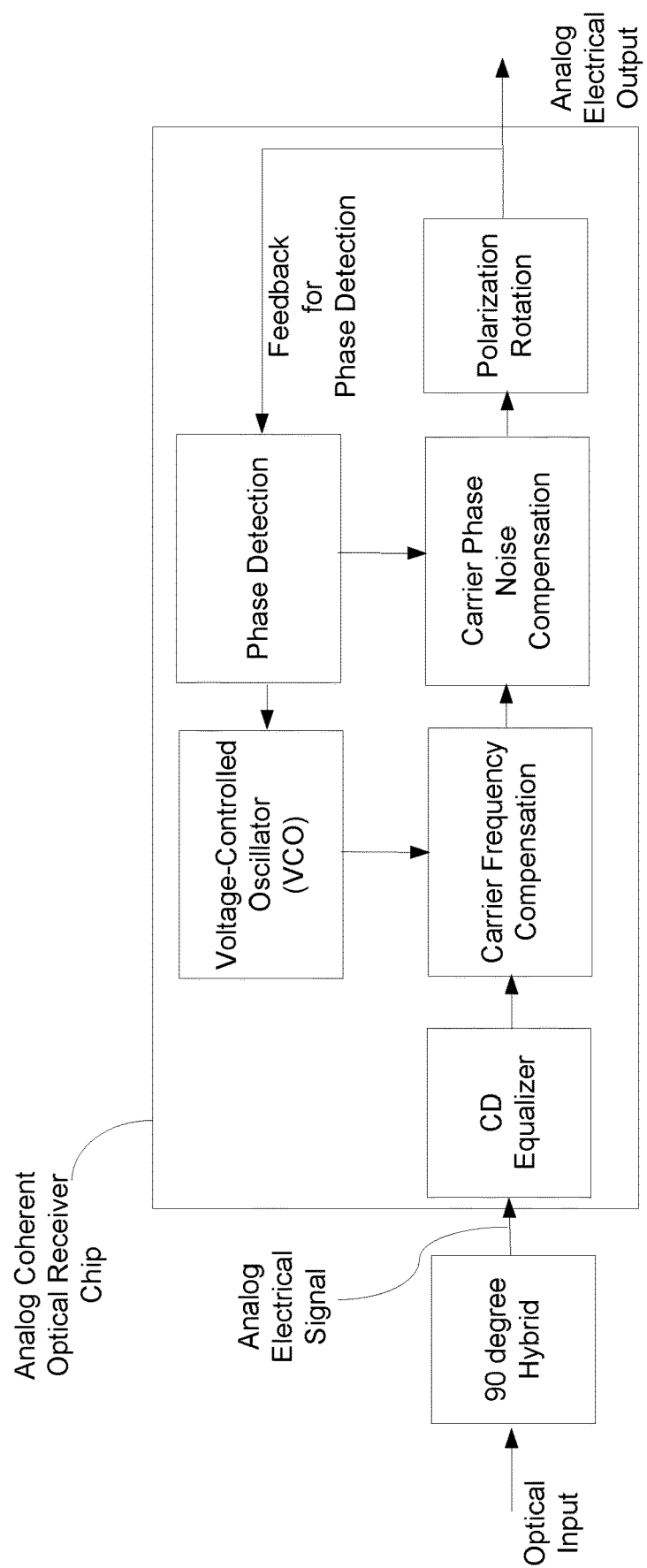
FIG. 1 shows an example of one example of an analog signal processing block as part of an optical receiver for coherent optical detection.

Digital Coherent Signal Processing (CSP) using digital signal processing (DSP) in coherent optical detection provides an effective way to improve the transmission performance in the long-haul fiber links (e.g., point-to-point fiber link lengths longer than 80 km). Various digital CSP implementations can be designed to provide equalization for chromatic dispersion (CD) and polarization-mode dispersion (PMD) in the electronic digital domain and apply adaptive algorithms such as the constant modulus algorithm (CMA) to compensate fiber transmission impairments such as PMD and CD effects. The CMA processing is insensitive to the phase offset or noise and thus can be implemented for polarization rotation to compensate for the PMD effect first and then the output signals of the CMA processing can be further processed to compensate for the optical phase offset or noise.

Digital CSP can also be used for Metro links with shorter fiber lengths. However, high power consumption of various digital CSPs (e.g., up to 7-12 W for 100 G in some digital CSP chips) and a large footprint of such digital CSP chips can create conflicts with some technical requirements in short-distance fiber link applications such as requirements for less power consumption, smaller chip size, and lower costs.

This patent document discloses optical receiver signal processing chip technologies based on mixed-signal technology to produce optical receiver chips with low-power and low cost solutions for short-reach markets such as short distance data links between certain data centers, e.g., fiber links for data centers under the AT&T's CORD architecture (Central Office Re-architected as a Datacenter). Low power and small size optical receiver chips allow extra density on routers and switches through the use of small and low power modules such as QSFP-DD, QSFP, CFP4 or other suitable module formats. In practical deployment, it can be difficult for various existing high—spectral density technology to fit in such compact formats.

The disclosed coherent optical receiver technology replaces digital coherent signal processing in parts of CSP by analog circuitry and analog processing. For example, analog CSP based on the disclosed technology does not require a high-speed analog to digital convertor (ADC) and the signal stays in analog domain until it reaches the output stage. Analog signal processing can be designed to consume dramatically less power and space and thus can be used to reduce the size and power consumption of analog CSP substantially below similar digital CSP devices.

The technology disclosed in this patent document can be implemented as a part of an optical receiver module for coherent optical detection where the optical receiver module receives the optical input from a fiber link, performs optical to electrical conversion and analog processing for carrier frequency compensation, optical phase noise compensation and polarization rotation, and generates an analog electrical output for subsequent digital signal processing for coherent optical detection. The analog processing for the polarization rotation is placed downstream from the analog processing for carrier frequency compensation, and in some implementations, downstream from the analog processing for optical phase noise compensation, and in some implementations analog processing for optical phase noise compensation is combined with analog polarization compensation block. In the latter case one of the additional advantages is a cycle-free performance of the optical phase noise compensating block. Such combination can be also implemented as described in digital coherent receivers where all the operations of carrier offset compensation, polarization rotation and optical phase noise compensation are performed digitally.

FIG. 1 shows an example of one example of an analog signal processing block as part of an optical receiver for coherent optical detection. In this example, the building blocks of the analog CSP portion are shown and are designed to perform similar functions of its digital counterpart, including CD compensation, carrier frequency compensation or carrier frequency offset cancellation, optical phase noise compensation or carrier phase noise compensation, and polarization rotation. Each illustrated circuitry block is an analog circuit.

In this particular example as illustrated in FIG. 1, the analog CSP part of the optical receiver admitting the analog electrical signal from 90 degree hybrid and includes a CD equalizer analog circuit, a carrier frequency compensation analog circuit, laser phase noise compensation analog circuit and a polarization rotation analog circuit. In addition, a phase detection circuit is coupled between the laser phase noise compensation analog circuit and the output port of the polarization rotation analog circuit to provide the phase detection information to the optical phase noise compensation analog circuit. A voltage controlled oscillator (VCO) circuit is also provided to use the phase detection information from the phase detection circuit in operating the carrier frequency compensation analog circuit. The 90-degree hybrid analog circuit receives and demodulates the received optical signal by using a reference laser light beam from a local oscillator laser to produce outputs with a 90-degree phase shift. In some implementations, a 90 degrees optical hybrid may be used and is coupled by a downstream pair of balanced photo detectors and an amplifier such as a transimpedance amplifier (TIA). Details of examples of the analog circuits in FIG. 1 are provided below.

The examples of analog CSP part of the optical receiver for coherent optical detection can be used to construct an analog chip to provide energy efficient processing and allows for versatile applications for subsequent signal processing downstream from the analog chip.

CD Compensation in Analog Domain

The analog circuit block "CD Equalizer" provides chromatic dispersion compensation in the analog signal domain and include Finite Impulse Response (FIR) or Infinite Impulse Response (IIR) analog equalizers. The delay elements for constructing FIR and IIR for the filters can be realized using passive or active delay lines based on the specific needs of the particular application for the optical receiver. In some implementations, passive delay lines can be built as RF waveguides using chains of RC elements or by building a metallic waveguide inside a chip, on a substrate or on the board outside of the electronic integrated circuit. Passive delay elements can be structured to maintain high linearity and bandwidth of the signal but may suffer, in some designs, from a large size of the device. Active delay lines can be configured to have a very small size, but may exhibit certain non-linearity problems depending on the design.

Carrier Frequency Compensation

The optical carrier frequency compensation is desirable because transmitting and receiving laser signals in optical communications generally may have different frequencies (e.g., up to 5 GHz in some system implementations). The CSP of the optical receiver can be designed to compensate for that difference. The compensation process may be explained by the following equations.

An optical fiber link includes an optical transmitter, a fiber link and an optical receiver. If $S_0$ is the initial optical signal coming out of optical transmitter and S represents the signal after the optical propagation in a fiber link. The relationship between the signals can be represented by $$S = S_0 \exp(j\Delta\omega t) \tag{1}$$

where $\Delta\omega$ is the frequency difference between optical signals at the transmitter and receiver. To compensate for the effects of frequency mismatch and recover the initial signal $S_0$, a rotation with the opposite sign can be applied to the signal:

$$S_0 = S \exp(-j\Delta\omega t) \tag{2}$$

The real and imaginary components of the expression (2) can be written as $$SI_0 = SI \cos(\Delta\omega t) - SQ \sin(\Delta\omega t)$$

$$SQ_0 = SI \sin(\Delta\omega t) + SQ \cos(\Delta\omega t) \tag{3}$$

Here $SI_0$ and $SQ_0$ are in-phase and quadrature components of the initial signal and SI and SQ are in-phase and quadrature of the signal after optical propagation.

Figure 2:
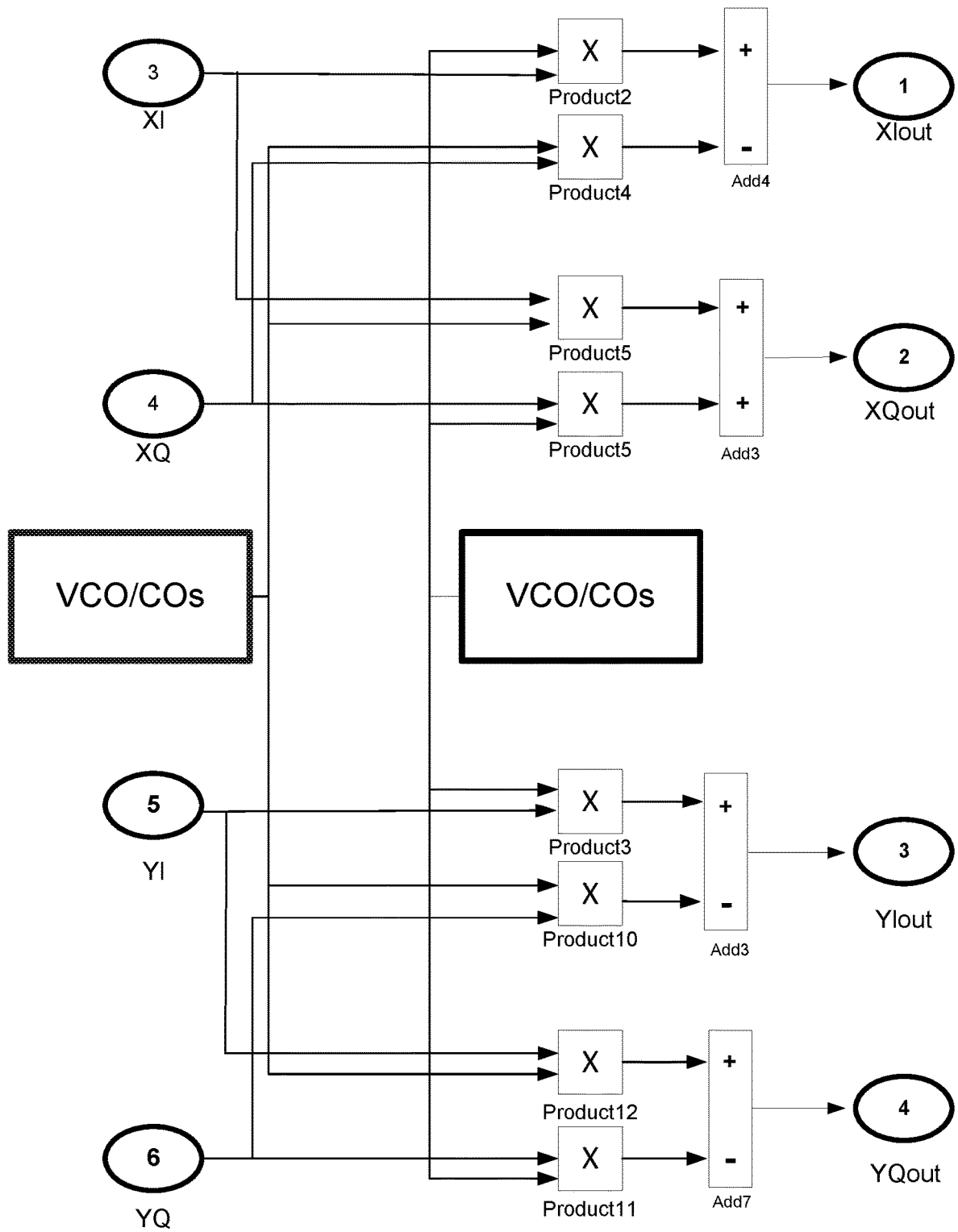
FIG. 2 shows an example of the carrier frequency compensation block in FIG. 1.

FIG. 2 shows an example of the carrier frequency compensation block in FIG. 1 that implements the above compensation model. Signals XI, XQ, YI, and YQ represent in-phase and quadrature components of the received signal.

As shown in FIG. 1, the analog signal processing block includes a phase detection circuit that is coupled between the carrier frequency compensation analog circuit and an output port of the polarization rotation analog circuit to provide phase detection information to the optical carrier frequency compensation and a voltage controlled oscillator (VCO) circuit coupled to use the phase detection information from the phase detection circuit in operating the carrier frequency compensation analog circuit.

In implementations, the Sin and Cos high speed signals can be generated using a high-speed Voltage Controlled Oscillators (VCO/Sin and VCO/Cos) with a suitable tuning range (e.g., from 0 to 5 GHz). These VCOs can be locked in quadrature with the phase difference of 90 degrees. Such a quadrature VCO receives a control signal from the phase/frequency detector, which adjusts the frequency of the Sin/Cos signals to that of the carrier frequency mismatch.

Laser Phase Noise Compensation

Figure 3:
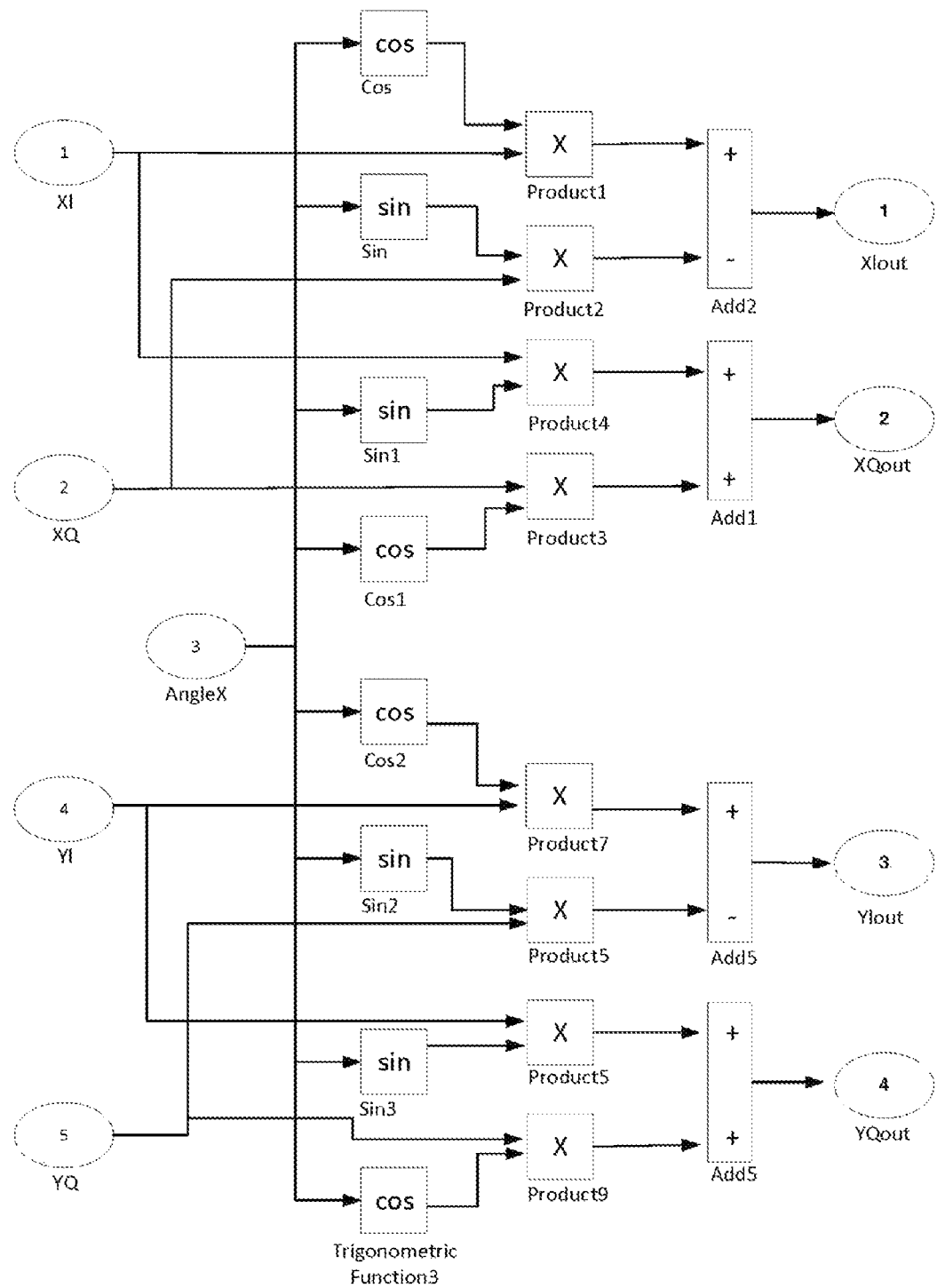
FIG. 3 shows one example for a laser phase noise compensation block suitable for the analog block in FIG. 1.

The optical or laser phase noise compensation analog circuit block in FIG. 1 can be structured in various ways, e.g., in a configuration similar to that of the frequency mismatch compensation. FIG. 3 shows one example for a laser phase noise compensation block suitable for the analog block in FIG. 1.

As shown in FIG. 1, the analog signal processing block may further include a phase detection circuit that is coupled between the optical phase noise compensation analog circuit and an output port of the polarization rotation analog circuit to provide phase detection information to the optical phase noise compensation analog circuit to use the phase detection information in operating the optical phase noise compensation analog circuit.

Because the phase noise is a random process, the phase noise tends to be difficult to be compensated by the sinusoidal signal from VCO. The high rate of change of the random optical phase between receiving and transmitting lasers can make such a solution unsuitable. In some device implementations, the delay between the input control signal and the output harmonic produced by the VCO may be too large for the fast changing optical phase.

For the phase noise compensation, the signal from Phase Detector in FIG. 1 can be fed into a Sine/Cosine analog generation block with low latency response as shown in FIG. 3 in which Angle X is a signal from a Phase Detection block in FIG. 1.

Figure 4:
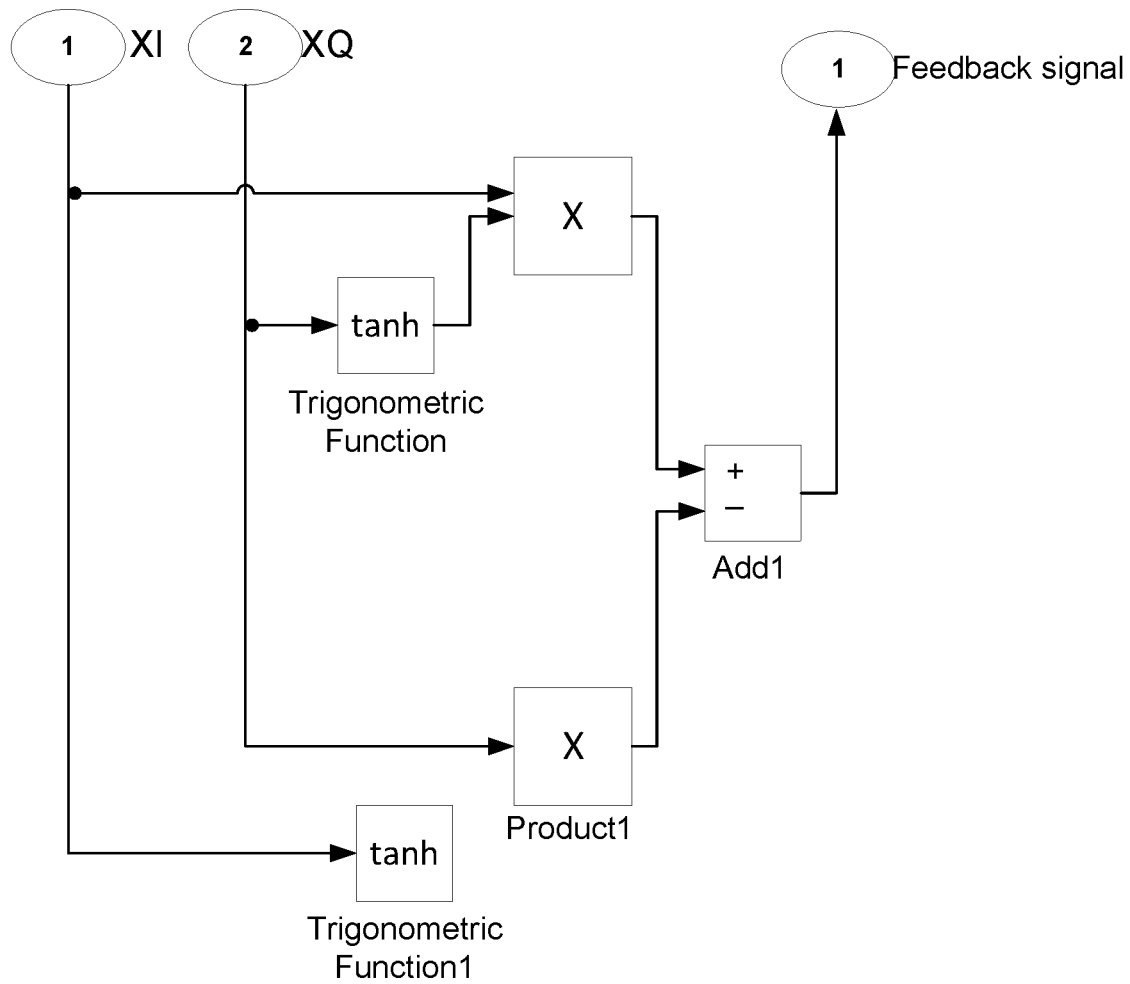
FIG. 4 shows an example of an analog circuit for generating of a feedback signal based on the phase detection in FIG. 1.

Generating of the feedback signal can be done in various ways, including, e.g., using Costas loops as depicted in FIG. 4.

Polarization Rotation

Optical signal experiences polarization rotation when propagating through the optical fiber. Such rotation is of a lower speed when compared with the Phase and Frequency rotation and the characteristic time of polarization rotation can be estimated as being close to 1 microsecond in various practical systems. The polarization compensation block can be realized using both analog and digital feedback designs.

The actual mechanism of the polarization rotation compensation can utilize methods similar to optical elements such as elements similar to optical wave plates. Also polarization compensation can be produced in a way similar to digital Coherent Signal Processors.

Figure 5:
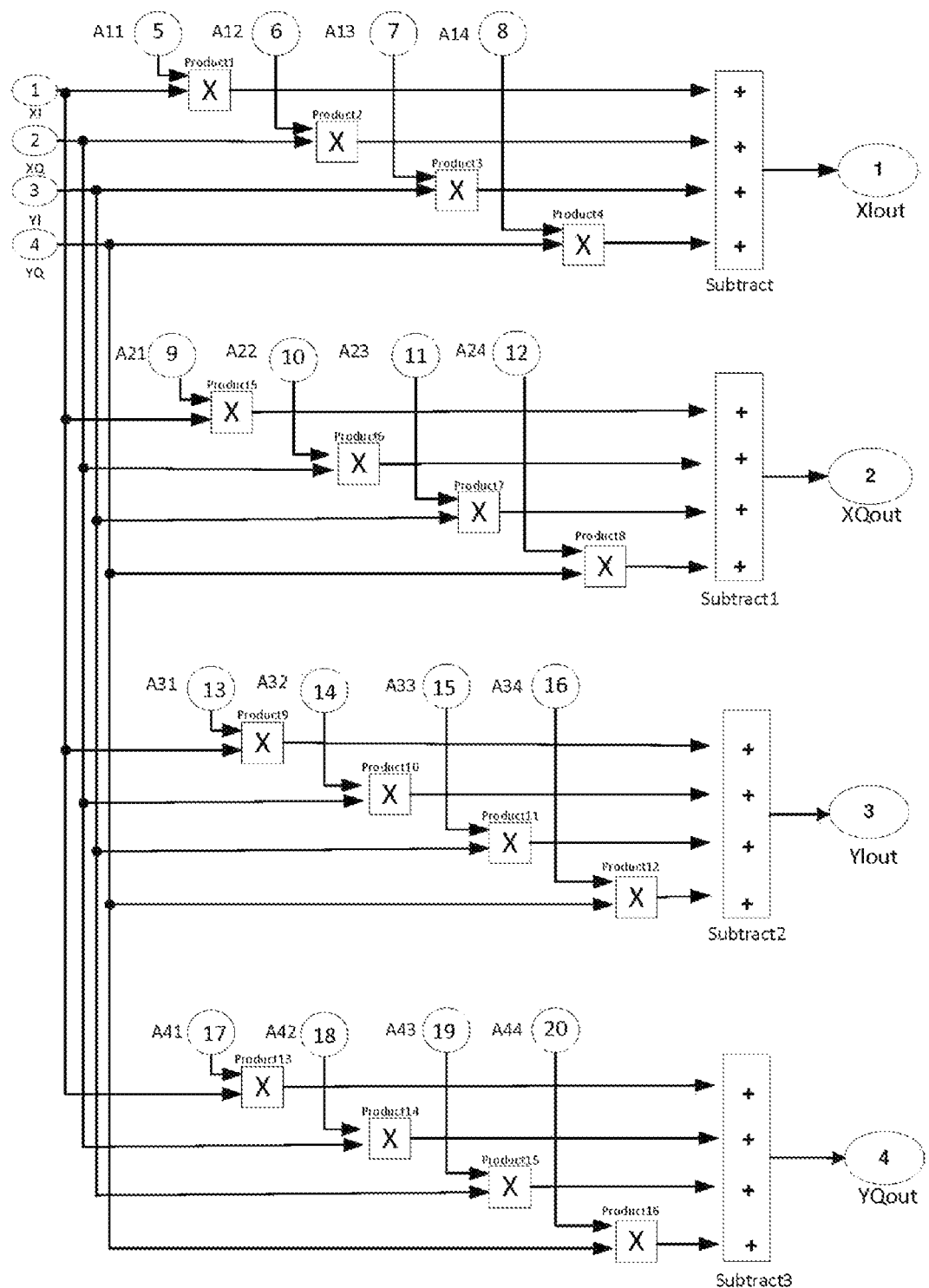
FIG. 5 shows an example of an analog circuit for performing the polarization rotation compensation in the design in FIG. 1. The same block in some implementations can be used for combination of polarization rotation compensation and optical phase noise compensation as in shown in FIG. 6.

FIG. 5 shows an example of an analog circuit for performing the polarization rotation compensation in the design in FIG. 1, where signals XI, XQ, YI, and YQ represent in-phase and quadrature components of the received signal and coefficients A11, A12 . . . A44 represent a polarization rotation matrix.

Notably, referring back to the design in FIG. 1, the analog polarization rotation compensation block is placed downstream from other analog processing blocks, e.g., downstream from the optical carrier frequency compensation and the optical phase noise compensation blocks. Different from various digital CSP implementations using the constant modulus algorithm (CMA) to compensate fiber transmission impairments such as PMD and CD effects, the analog polarization rotation compensation block in FIG. 1 can be designed to implement an adaptive algorithm that is less complex than the CMA and consumes less power than CMA. In analog implementation CMA is not a good choice due to the need of multiple high-speed signal multiplications. For X polarization, assuming XI to be an in-phase and XQ to be a quadrature component, the CMA error can be expressed as:

$$\varepsilon_{CMA}=1-XI^2-XQ^2 \quad (4)$$

The coefficient adaptation formula for in-phase component, for example, can be expressed as:

$$C_{XI}=C_{XI}+\mu\varepsilon_{CMA}(XI'\cdot XI^*+XQ'\cdot XQ^*) \quad (5)$$

where XI' is the signal at the output of the equalization block and XI is the input to it. '*' sign is a complex conjugation. It follows from (4) and (5) that CMA adaptation involves three times multiplication of a high-speed signal (four signals must be multiplied together). Such complex signal processing tends to be difficult to implement in analog processing and thus is not practical. Triple multiplication in CMA will degrade the quality of CMA adaptation in analog processing and can introduce undesired nonlinearity into the analog system with CMA adaptation. Also, CMA adaptation in analog processing becomes problematic at higher speeds when an amplitude of the signal is modulated at several levels (8 QAM, 16 QAM etc.)

For analog implementations of the disclosed technology, simpler adaptive algorisms may be selected for analog processing. For example, coefficient adaptation for the least mean square (LMS) involves only one multiplication and thus is better suited for analog processing:

$$\varepsilon_{LMS}=\text{Tan } h(XI)-XI' \quad (6)$$

$$C_{XI}=C_{XI}+\mu\varepsilon_{LMS}XI \quad (7)$$

where Tan h denotes a hyperbolic tangent, which is easily realizable in analog design. One can also implement a wide range of nonlinear compressing functions with nonlinear output that is not necessary an exact Tan h function. The degree of compression can range from very strong such as in a sign function to a very mild compression. For more complex amplitude modulation formats such as QAM16, QAM32 or higher the exact multi-level slicer can be used in place of a Tan h function.

The polarization rotation compensation analog block in FIG. 1 can be designed to implement the Least Mean Square method (LMS) instead of Constant Amplitude Module (CMA) method. As explained above, LMS is much simpler and easier to implement in the analog domain. Since the LMS can be sensitive to the phase noise, the Polarization Rotation Block can be placed after the Frequency and Phase compensation blocks. This configuration allows to use a much simpler Least Mean Square method as compared with the Constant Amplitude Module method.

In implementations, the LMS-based polarization adaptation block should be placed downstream from the phase and frequency recovery blocks and, if placed in before the phase and frequency recovery blocks, the desired operation may be compromised. This is in part because the expression (6) will not work if the signal XI' is compromised by the phase or frequency uncompensated rotation. Expression (6) represents a good approximation to the LMS error only if phase and frequency effects are compensated for. Therefore, the LMS block should be placed after frequency and phase blocks.

In addition to mentioned advantages LMS in some implementations can be also used as a Laser Phase Noise Compensating module. This is possible because the phase between the XI and XQ components can be compensated using LMS loops in place of Costas loops as it is described above and architecture used in FIG. 5. In such cases a separate Laser Phase Noise block is not necessary and Polarization Rotation Block will take on functions of the Laser Phase Noise Compensation.

Figure 6:
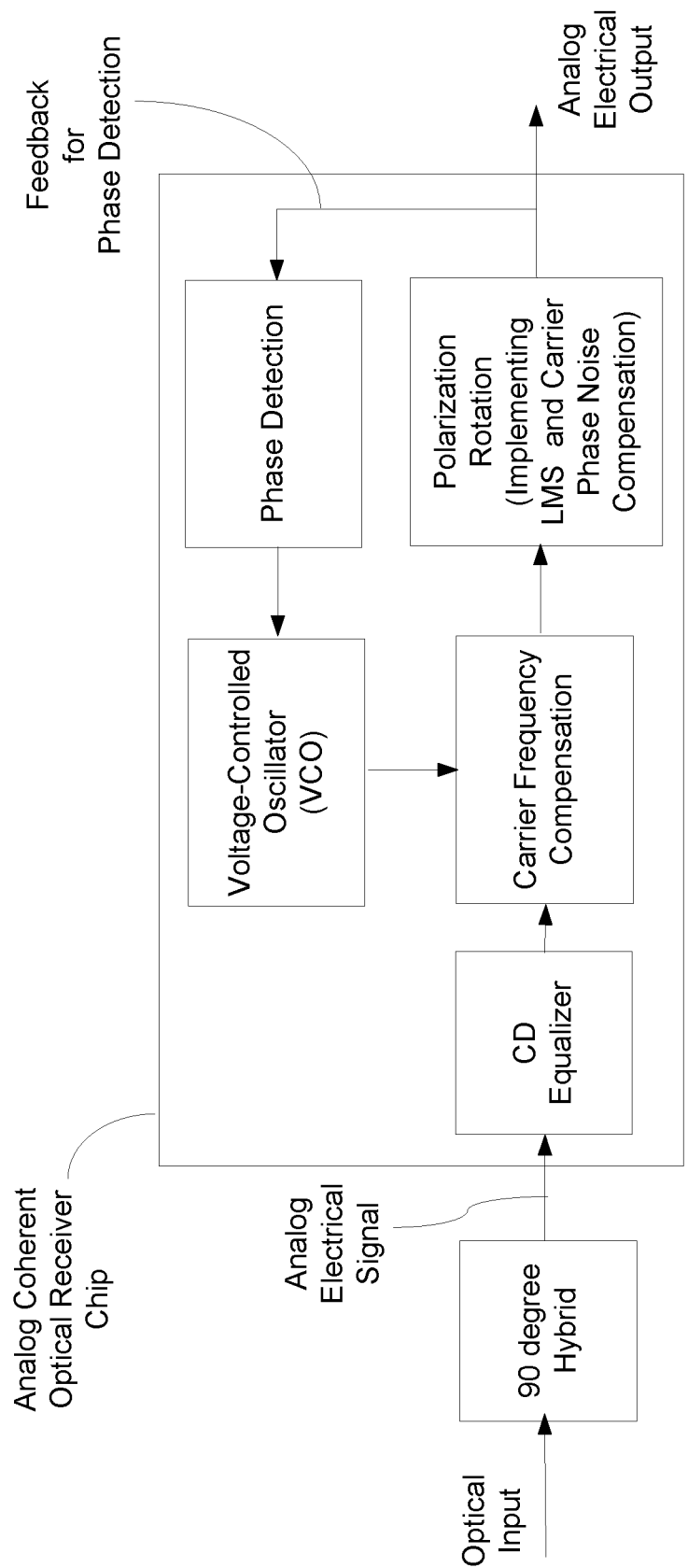
FIG. 6 shows an example of an analog signal processing block as part of an optical receiver for coherent optical detection where the polarization rotation processing block is coupled downstream from the carrier frequency compensation analog circuit to implement an analog least mean square algorithm for the polarization rotation processing and to perform optical phase noise compensation to received signals from the carrier frequency compensation analog circuit so that a separate optical phase noise compensation block can be eliminated.

FIG. 6 shows an example of an analog signal processing block as part of an optical receiver for coherent optical detection where the polarization rotation processing block is coupled downstream from the carrier frequency compensation analog circuit to implement an analog least mean square algorithm for the polarization rotation processing and to perform optical phase noise compensation to received signals from the carrier frequency compensation analog circuit so that a separate optical phase noise compensation block can be eliminated.

In implementations, various combinations of Costas loops and LMS blocks can be used. For example, the phase between XI and XQ components can be adapted using LMS method, but the phase between YI and YQ compensated by a combination of LMS and Costas loops. Using LMS and avoiding phase compensation using Costas loops leads to some more advantages. For example, in some cases, there is no need of generating Sin and Cos functions if LMS adaptation is used. For another example, a difficult problem of re-winding of sinusoidal function due to periodicity for large values of argument is solved naturally and re-winding is not required. Yet another advantage of a combined polarization rotation and laser phase noise block is the fact that phase noise recovery in this case will not suffer from a so-called cycle slip phenomena. For yet another example, LMS compensation can be implemented to work with multiple amplitude level formats such as 8QAM, 16QAM etc.

Figure 7:
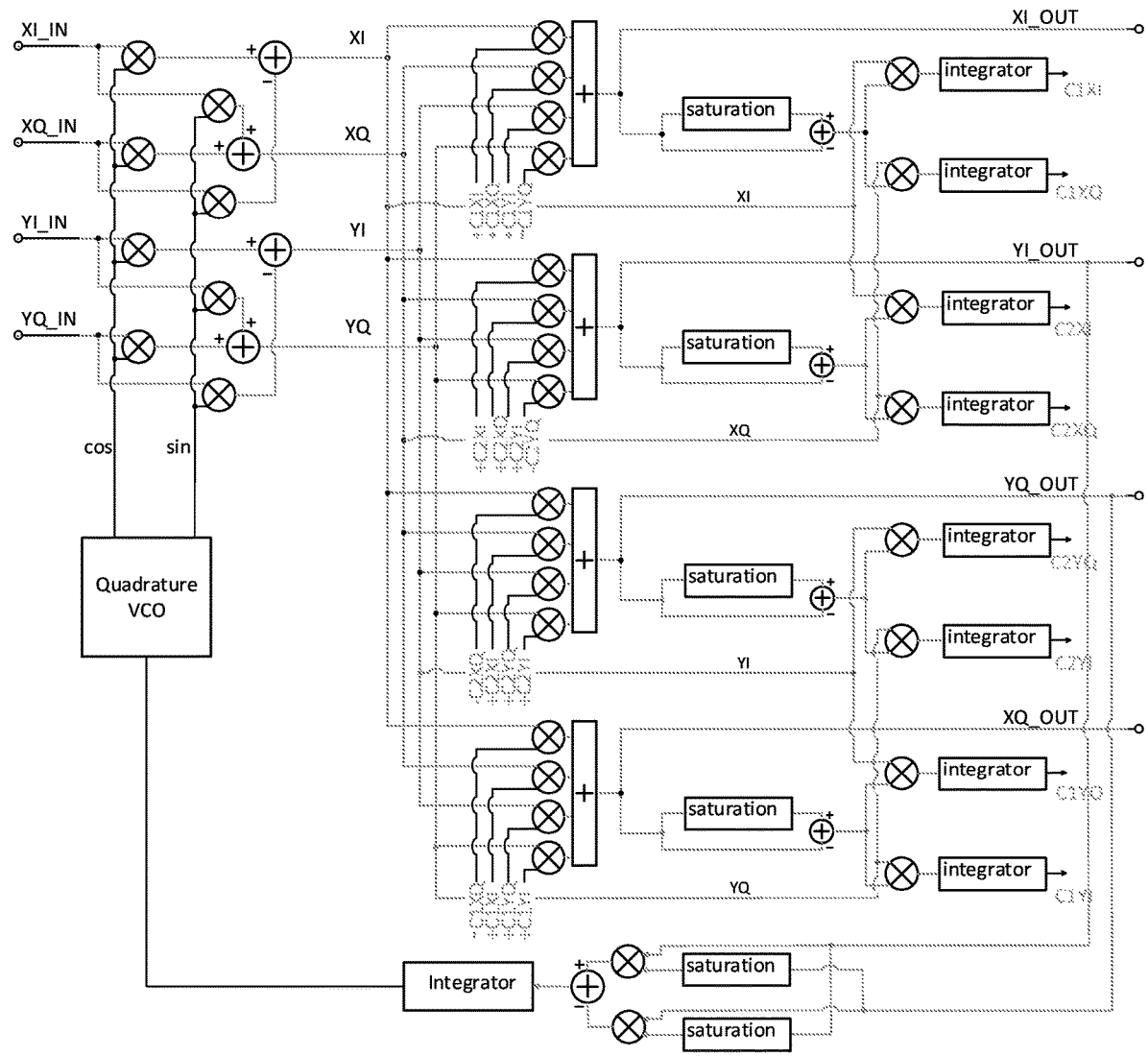
FIG. 7 shows an example of one of the embodiments of the analog coherent processor based on the disclosed technology showing some additional details.

FIG. 7 shows an example of one of the embodiments of the analog coherent processor based on the disclosed technology showing some additional details. In this embodiment the polarization rotation block contains eight independent coefficients. Other embodiments may contain from three to sixteen independent coefficients. In order to reduce the power dissipation only four LMS blocks where used. Each of these blocks is shared between two independent coefficients. Quadrature VCO in this figure can be composed of one or more separate VCOs. The signal analog processing block may or may not contain the frequency correction part including the quadrature VCO. In the latter case the input from the 90 degree hybrid is fed directly into the polarization rotation block.

In the above examples, a chromatic dispersion equalizer is used as part of the optical coherent receiver. In other implementations, the chromatic dispersion equalizer may be eliminated, and the input can be directly coupled other blocks shown in FIG. 1, including, for example, a configuration without the CD compensation and carrier frequency compensation in which the optical input (from 90 degree hybrid) is directly coupled to the polarization rotation block. For example, a coherent optical receiver for a fiber communication link including an analog signal processing block as part of the optical receiver can include the following in the analog signal processing block without the CD compensation block: an input port to receive electrical signals with a 90-degree phase shift based on an optical signal; a carrier frequency compensation analog circuit to perform a carrier frequency compensation of a carrier frequency offset in the optical signal; an optical phase noise compensation analog circuit to perform a phase noise compensation to recover carrier phase of the optical signal; and a polarization rotation analog circuit downstream from the carrier frequency compensation analog circuit and optical phase noise compensation analog circuit to cause polarization rotation compensation in received signals. In one implementation of this receiver, the optical phase noise compensation analog circuit is coupled downstream from the carrier frequency compensation analog circuit. In another implementation of this receiver, the analog signal processing block can further include a phase detection circuit that is coupled between the carrier frequency compensation analog circuit and an output port of the polarization rotation analog circuit to provide phase detection information to the carrier frequency compensation analog circuit and a voltage controlled oscillator (VCO) circuit coupled to use the phase detection information from the phase detection circuit in operating the carrier frequency compensation analog circuit.

In some implementations where the phase noise compensation is done in the same block with the polarization rotation no cycle slips are produced. Such an implementation can be important to a receiver in which no digital processing is done inside the digital part of the module (CDR or gearbox).

In addition, the disclosed coherent optical detection architecture with the combination of polarization rotation and phase noise compensation can be used in digital receivers to eliminate cycle slips and reduce power dissipation.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

What is claimed is what is described and illustrated, including:

1. A coherent optical receiver for a fiber communication link, comprising an analog signal processing block as part of the optical receiver, wherein the analog signal processing block includes:
   an input port to receive electrical signals with a 90-degree phase shift based on an optical signal;
   a chromatic dispersion equalizer analog circuit to process the electrical signals to provide chromatic dispersion compensation in the optical signal;
   a carrier frequency compensation analog circuit to perform a carrier frequency compensation of a carrier frequency offset in the optical signal;
   an optical phase noise compensation analog circuit to perform a phase noise compensation to recover carrier phase of the optical signal; and
   a polarization rotation analog circuit downstream from the carrier frequency compensation analog circuit and optical phase noise compensation analog circuit to cause polarization rotation compensation in received signals.

2. The coherent optical receiver as in claim 1, wherein the carrier frequency compensation analog circuit is coupled downstream from the chromatic dispersion equalizer, the optical phase noise compensation analog circuit is coupled downstream from the carrier frequency compensation analog circuit.

3. The coherent optical receiver as in claim 1, wherein the analog signal processing block further includes
   a phase detection circuit that is coupled between the carrier frequency compensation analog circuit and an output port of the polarization rotation analog circuit to provide phase detection information to the carrier frequency compensation analog circuit; and
   a voltage controlled oscillator (VCO) circuit coupled to use the phase detection information from the phase detection circuit in operating the carrier frequency compensation analog circuit.

4. A coherent optical receiver for a fiber communication link, comprising an analog signal processing block as part of the optical receiver, wherein the analog signal processing block includes:
   an input port to receive electrical signals with a 90-degree phase shift based on an optical signal;
   a chromatic dispersion equalizer analog circuit to process the electrical signals to provide chromatic dispersion compensation in the optical signal;
   a carrier frequency compensation analog circuit to perform a carrier frequency compensation of a carrier frequency offset in the optical signal;
   an optical phase noise compensation analog circuit to perform a phase noise compensation to recover carrier phase of the optical signal; and
   a polarization rotation analog circuit downstream from the carrier frequency compensation analog circuit and optical phase noise compensation analog circuit to cause polarization rotation compensation in the electrical signals,
   wherein the analog signal processing block further includes
   a phase detection circuit that is coupled between the optical phase noise compensation analog circuit and an output port of the polarization rotation analog circuit to provide phase detection information to the optical phase noise compensation analog circuit; and
   a voltage controlled oscillator (VCO) circuit coupled to use the phase detection information from the phase detection circuit in operating the optical phase noise compensation analog circuit.

5. A coherent optical receiver for a fiber communication link, comprising an analog signal processing block as part of the optical receiver, wherein the analog signal processing block includes:
   an input port to receive electrical signals with a 90-degree phase shift based on an optical signal;
   a chromatic dispersion equalizer analog circuit to process the electrical signals to provide chromatic dispersion compensation in the optical signal;
   a carrier frequency compensation analog circuit to perform a carrier frequency compensation of a carrier frequency offset in the optical signal;
   an optical phase noise compensation analog circuit to perform a phase noise compensation to recover carrier phase of the optical signal; and
   a polarization rotation analog circuit downstream from the carrier frequency compensation analog circuit and optical phase noise compensation analog circuit to cause polarization rotation compensation in the electrical signals,
   wherein the analog signal processing block further includes
   a phase detection circuit that is coupled to an output port of the polarization rotation analog circuit to provide phase detection information to the carrier frequency compensation analog circuit and the optical phase noise compensation circuit; and
   a voltage controlled oscillator (VCO) circuit coupled to use the phase detection information from the phase detection circuit in operating the carrier frequency compensation analog circuit and the optical phase noise compensation circuit.

6. The coherent optical receiver as in claim 1, wherein the polarization rotation analog circuit is structured to implement a least mean square algorithm for analog processing.

7. A coherent optical receiver for a fiber communication link, comprising an analog signal processing block as part of the optical receiver, wherein the analog signal processing block includes:
   a chromatic dispersion equalizer analog circuit to receive signals that are from or derived from signals produced by a 90-degree hybrid analog block to provide chromatic dispersion compensation to the received signals;
   a carrier frequency compensation analog circuit to cause carrier frequency compensation in the received signals; and
   a polarization rotation analog circuit coupled downstream from the carrier frequency compensation analog circuit to implement an analog least mean square algorithm for polarization rotation processing and to perform optical phase noise compensation to received signals from the carrier frequency compensation analog circuit.

8. The coherent optical receiver as in claim 7, wherein the analog signal processing block further includes
   a phase detection circuit that is coupled between the carrier frequency compensation analog circuit and an output port of the polarization rotation analog circuit to provide phase detection information to the carrier frequency compensation analog circuit; and
   a voltage controlled oscillator (VCO) circuit coupled to use the phase detection information from the phase detection circuit in operating the carrier frequency compensation analog circuit.

9. A coherent optical receiver for a fiber communication link, comprising an analog signal processing block as part of the optical receiver, wherein the analog signal processing block includes:
an input port to receive electrical signals with a 90-degree phase shift based on an optical signal;
a carrier frequency compensation analog circuit to perform a carrier frequency compensation of a carrier frequency offset in the optical signal;
an optical phase noise compensation analog circuit to perform a phase noise compensation to recover carrier phase of the optical signal; and
a polarization rotation analog circuit downstream from the carrier frequency compensation analog circuit and optical phase noise compensation analog circuit to cause polarization rotation compensation in received signals.

10. The coherent optical receiver as in claim 9, wherein the optical phase noise compensation analog circuit is coupled downstream from the carrier frequency compensation analog circuit.

11. The coherent optical receiver as in claim 9, wherein the analog signal processing block further includes
a phase detection circuit that is coupled between the carrier frequency compensation analog circuit and an output port of the polarization rotation analog circuit to provide phase detection information to the carrier frequency compensation analog circuit; and
a voltage controlled oscillator (VCO) circuit coupled to use the phase detection information from the phase detection circuit in operating the carrier frequency compensation analog circuit.

12. The coherent optical receiver as in claim 4, further comprising:
a 90-degree optical hybrid module to receive an optical signal and a reference laser light beam from a local oscillator laser to produce optical outputs with a 90-degree phase shift;
photodetectors coupled to receive the optical outputs from the 90-degree optical hybrid module, respectively, and to produce detector signals representative of the optical signal; and
an amplifier coupled to receive and amplify the detector signals as the electrical signals to be received at the input port of the analog signal processing block.

13. The coherent optical receiver as in claim 4, wherein the polarization rotation analog circuit is structured to implement a least mean square algorithm for analog processing.

14. The coherent optical receiver as in claim 4, wherein the carrier frequency compensation analog circuit is coupled downstream from the chromatic dispersion equalizer, and the optical phase noise compensation analog circuit is coupled downstream from the carrier frequency compensation analog circuit.

15. The coherent optical receiver as in claim 5, wherein the carrier frequency compensation analog circuit is coupled downstream from the chromatic dispersion equalizer, the optical phase noise compensation analog circuit is coupled downstream from the carrier frequency compensation analog circuit.

16. The coherent optical receiver as in claim 5, wherein the polarization rotation analog circuit is structured to implement a least mean square algorithm for analog processing.

17. The coherent optical receiver as in claim 5, further comprising:
a 90-degree optical hybrid module to receive an optical signal and a reference laser light beam from a local oscillator laser to produce optical outputs with a 90-degree phase shift;
photodetectors coupled to receive the optical outputs from the 90-degree optical hybrid module, respectively, and to produce detector signals representative of the optical signal; and
an amplifier coupled to receive and amplify the detector signals as the electrical signals to be received at the input port of the analog signal processing block.

18. A coherent optical receiver for receiving an optical signal from a fiber communication link, comprising:
a 90-degree optical hybrid module to receive an optical signal and a reference laser light beam from a local oscillator laser to produce optical outputs with a 90-degree phase shift in each polarization;
photodetectors coupled to receive the optical outputs from the 90-degree optical hybrid module, respectively, and to produce detector signals representative of the optical signal;
a chromatic dispersion equalizer circuit to receive signals based on the detector signals to provide chromatic dispersion compensation to the received signals;
a single processing module for phase noise compensation and polarization rotation compensation coupled downstream from the chromatic dispersion equalizer circuit to receive and process an electrical signal representative of an output of the chromatic dispersion equalizer circuit to perform both (1) a phase noise compensation of an effect of a phase noise in the optical signal (2) a compensation for an effect caused by a polarization rotation in the received optical signal; and
a phase detection circuit that is coupled downstream from the single processing module for carrier frequency compensation and polarization rotation compensation to detect signal phase information and connected directly to the local oscillator laser to remove carrier frequency offset.

19. The coherent optical receiver as in claim 18, wherein the single processing module for carrier frequency compensation and polarization rotation compensation is structured to implement a least mean square algorithm in performing both the compensation for the effect caused by the polarization rotation in the received optical signal and the phase noise compensation.

20. The coherent optical receiver as in claim 19, wherein the single processing module for carrier frequency compensation and polarization rotation compensation is structured to implement the least mean square algorithm for quadrature amplitude modulation (QAM) formats including 8QAM, 16QAM or 32 QAM formats.

21. The coherent optical receiver as in claim 18, further comprising:
a carrier frequency compensation circuit to cause carrier frequency compensation in the received signals;
a phase detection circuit that is coupled between the carrier frequency compensation circuit and an output port of the single processing module for carrier phase compensation and polarization rotation compensation to provide phase detection information to the carrier frequency compensation circuit; and
a voltage controlled oscillator (VCO) circuit coupled to use the phase detection information from the phase detection circuit in operating the carrier frequency compensation circuit.

* * * * *